United States Patent [19]

Lee et al.

[11] 4,167,399

[45] Sep. 11, 1979

[54] PROCESS FOR PREPARING A POLYCRYSTALLINE DIAMOND BODY

[75] Inventors: Minyoung Lee, Schenectady; Laurence E. Szala, Scotia; Robert C. DeVries, Burnt Hills, all of N.Y.

[73] Assignee: General Electric Company, Schenectady, N.Y.

[21] Appl. No.: 894,760

[22] Filed: Apr. 10, 1978

Related U.S. Application Data

[62] Division of Ser. No. 844,446, Oct. 21, 1977, abandoned.

[51] Int. Cl.$^2$ ............................ C04B 35/56; C04B 35/58
[52] U.S. Cl. ............................................ 51/307; 51/309; 106/44
[58] Field of Search ................... 51/307, 308, 295, 309; 106/44

[56] References Cited

U.S. PATENT DOCUMENTS

| | | | |
|---|---|---|---|
| 3,239,321 | 3/1966 | Blainey et al. | 51/309 |
| 3,574,580 | 4/1971 | Stromberg et al. | 51/309 |
| 3,850,591 | 11/1974 | Wentorf | 51/309 |
| 3,852,078 | 12/1974 | Wakatsuki et al. | 51/309 |
| 3,912,500 | 10/1975 | Vereschagin | 51/309 |
| 3,913,280 | 10/1975 | Hall | 51/307 |
| 3,982,911 | 9/1976 | Lee | 51/307 |

*Primary Examiner*—Donald J. Arnold
*Attorney, Agent, or Firm*—Jane M. Binkowski; Joseph T. Cohen; Charles T. Watts

[57] ABSTRACT

A cavity of predetermined size is formed in a compressed pressure transmitting powder medium, a mass of diamond crystals in contact with a mass of elemental silicon are disposed within the cavity and additional pressure transmitting powder is placed over the cavity and its contents producing a powder-enveloped cavity. Pressure is applied to the powder medium resulting in substantially isostatic pressure being applied to the cavity therein and its contents sufficient to dimensionally stabilize the cavity and its contents. The resulting shaped substantially isostatic system of powder-enveloped diamond and silicon is hot-pressed to liquefy and infiltrate the silicon through the interstices between the diamond crystals producing, upon cooling, an adherently bonded integral body.

7 Claims, 4 Drawing Figures

PROCESS FOR PREPARING A POLYCRYSTALLINE DIAMOND BODY

This is a division of application Ser. No. 844,446, filed Oct. 21, 1977 and now abandoned.

This invention relates to the production of a polycrystalline diamond body comprised of a dense mass of diamond crystals bonded together by a silicon atom-containing bonding medium.

The present process utilizes pressures substantially below those required by the diamond stable region to produce a polycrystalline diamond body wherein the diamond crystals are bonded together by a silicon-atom containing bonding medium. The present body can be produced in a number of configurations and a wide range of sizes. It is useful as an abrasive, cutting tool, nozzle or other wear-resistant part.

Briefly stated, the present process for preparing a polycrystalline diamond body includes a hot-pressing step and comprises pressing a cavity of predetermined size at ambient temperature in a pressure transmitting powder medium under pressure sufficient to make the powder at least substantially stable in form, said pressure transmitting powder medium transmitting applied pressure substantially undiminished and remaining substantially unsintered during said hot-pressing, placing within said cavity a mass of silicon and a mass of diamond crystals in contact with said mass of silicon, covering said cavity and its contents with an additional amount of said pressure transmitting powder medium thereby enveloping the cavity with said pressure transmitting powder, applying sufficient substantially isostatic pressure to said cavity and its contents via said powder medium to substantially stabilize the dimensions of said cavity and said contents substantially uniformly producing a shaped substantially isostatic system of powder-enveloped cavity wherein the density of the resulting compressed mass of diamond crystals is higher than 65% by volume of the volume of said compressed diamond crystals, said silicon being used in an amount sufficient to fill the interstices of said compressed mass of diamond crystals, providing said substantially isostatic system including said cavity and contents with an atmosphere in which said diamond crystals and silicon are at least substantially inert during said hot-pressing, hot-pressing the resulting substantially isostatic system to produce fluid silicon and infiltrate it through the interstices of said compressed mass of diamond crystals, said hot-pressing being carried out at a temperature ranging from a temperature at which said silicon becomes fluid up to about 1600° C. under a pressure sufficient to infiltrate the fluid silicon through the interstices of said compressed mass of diamond crystals, said hot-pressing converting less than 5% by volume of said diamond crystals to non-diamond elemental carbon, said non-diamond carbon or the surfaces of said diamond crystals reacting with said silicon forming silicon carbide, maintaining sufficient pressure on the resulting hot-pressed substantially isostatic system during cooling thereof to at least substantially maintain the dimensions of said hot-pressed system, and recovering the resulting polycrystalline diamond body comprised of diamond crystals bonded together by a silicon-atom containing medium comprised of silicon carbide and silicon, and wherein the diamond crystals are present in an amount of at least 65% by volume of the total volume of said body.

Those skilled in the art will gain a further and better understanding of the present invention from the detailed description set forth below, considered in conjunction with the figures accompanying and forming a part of the specification, in which.

Figure 3:
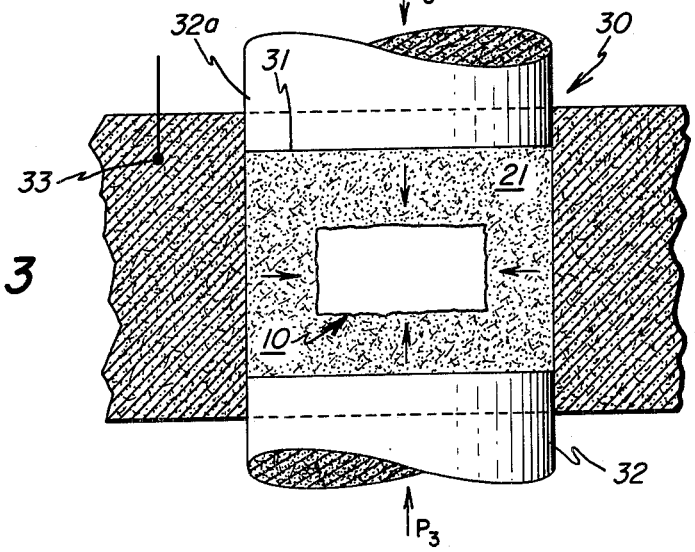
Figure 4:
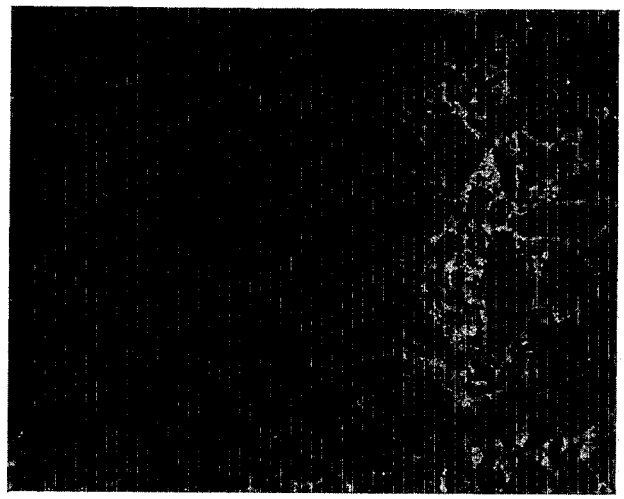

FIG. 3 is a sectional view through a graphite mold for the simultaneous application of heat and pressure to the substantially isostatic system showing the cell enclosed therein and FIG. 4 is a photograph (magnified 690×) of a polished transverse section of a diamond body prepared by the present process wherein the diamond content was 72% by volume of the body. The light greyish-white phase of FIG. 4 is bonding medium and the grey phase is diamond crystal. The dark spots are dirt.

In carrying out the present process, a mass of diamond crystals in contact with a mass of silicon are subjected to a cold pressing step at ambient temperature or room temperature to substantially stabilize their dimensions substantially uniformly and then to a hot-pressing step whereby the silicon is infiltrated through the mass of compressed diamond crystals.

The mass of diamond crystals and mass of silicon can be in a number of forms. For example, each mass can be in the form of a layer with one layer superimposed on the other. Alternatively, the silicon can be in the form of a tube, or cylinder with a core extending through it, and the diamond crystals can be packed within the core of the silicon cylinder. In still another embodiment, silicon can be in the form of a bar which can be centrally positioned in the cavity and the encircling space between the silicon bar and the interior wall of the cavity packed with diamond crystals.

The diamond crystals used in the present process can be natural or synthetic, i.e. man-made. They range in size in largest dimension from about 1 micron to about 1000 microns, and the particular size or sizes used depends largely on the particular packing or density of diamond crystals desired and also on the particular use of the resulting body. However, crystals smaller than 5 microns in size must be admixed with crystals larger than 10 microns in size, and the crystals smaller than 5 microns in size preferably should not constitute more than 50% by volume of the diamond mixture in order to allow satisfactory infiltration by the silicon. For most abrasive applications, diamond crystals no greater than about 60 microns are preferred. Preferably, to maximize the packing of the diamond crystals, they should be size-graded to contain a range of sizes, i.e. small, medium and large-sized crystals. Preferably, the size-graded crystals range from about 1 micron to about 60 microns, and preferably within this size range, about 60% to about 80% by volume of the total mass of crystals are of the larger sized portion of the range, about 5% to about 10% by volume are of medium size with the balance constituting the small-sized crystals or particles.

Sizing of the diamond crystals is facilitated by the jet-milling of larger diamond crystals. Preferably, the diamond crystals are chemically cleaned to remove any oxides or other impurities from the surface thereof before use in the present process. This may be accomplished by heating the diamond crystals in hydrogen at about 900° C. for about one hour.

In the present invention silicon is used for infusing or infiltrating through the voids or interstices between the diamond crystals. The silicon which, for example, may be in the form of a solid or powder, is used in an amount sufficient to fill the voids or interstices of the mass of diamond crystals having a crystal density higher than 65% by volume of the volume occupied by the crystals. Generally, the silicon can be used in an amount ranging from about 25% by volume to about 80% by volume, but preferably for best results it ranges from about 30% to about 60% by volume of the volume of diamond crystals having a density of crystals higher than 65% by volume.

The present hot-pressing step is carried out in an atmosphere which has no significant deleterious effect on the properties of the diamond crystals or infiltrating silicon. Specifically, the hot-pressing step can be carried out in a substantial vacuum or in an inert gas such as argon or helium, or it can be carried out in nitrogen or hydrogen. The present hot-pressing is carried out sufficiently rapidly so that there is no significant reaction between the fluid silicon and nitrogen or hydrogen. The present hot-pressing step cannot be carried out in air because diamond graphitizes rapidly in air above 800° C. and the liquid silicon would oxidize to form solid silica before any significant infusion by fluid silicon of the diamond mass occurred.

The present hot-pressing is carried out from a temperature at which silicon becomes fluid up to about 1600° C. under a pressure which need only be sufficient at the hot-pressing temperature to break up interfacial refractory layers in the diamond mass which prevent penetration by the fluid silicon through the voids thereof and usually this requires a minimum pressure of about 500 psi. Specifically, the hot-pressing pressure can range from about 500 psi to 20,000 psi, but usually it ranges from about 1000 psi to about 10,000 psi. Hot-pressing pressures higher than about 10,000 psi provide no significant advantage. Likewise, temperatures higher than 1600° C. provide no significant advantage and may graphitize the diamonds excessively.

By a temperature at which silicon becomes fluid it is meant herein a temperature at which the silicon is readily flowable. Specifically, when silicon is at its melting temperature, which has been given in the art to range from about 1412° C. to about 1430° C., it has a high viscosity, but as its temperature is raised, it becomes less viscous and at a temperature about ten degrees higher than its melting point, it becomes fluid. The temperature at which the silicon is fluid is the temperature at which it will infuse or infiltrate through the capillary-size passages, interstices or voids of the present compressed mass of diamond crystals having a crystal density higher than 65% by volume. With still additional increase in temperature, the flowability of the fluid silicon increases resulting in a faster rate of penetration through the mass of diamond crystals, and at the maximum hot-pressing temperature of about 1600° C., the liquid silicon has its highest flowability and fastest rate of penetration through the crystal mass.

Figure 1:
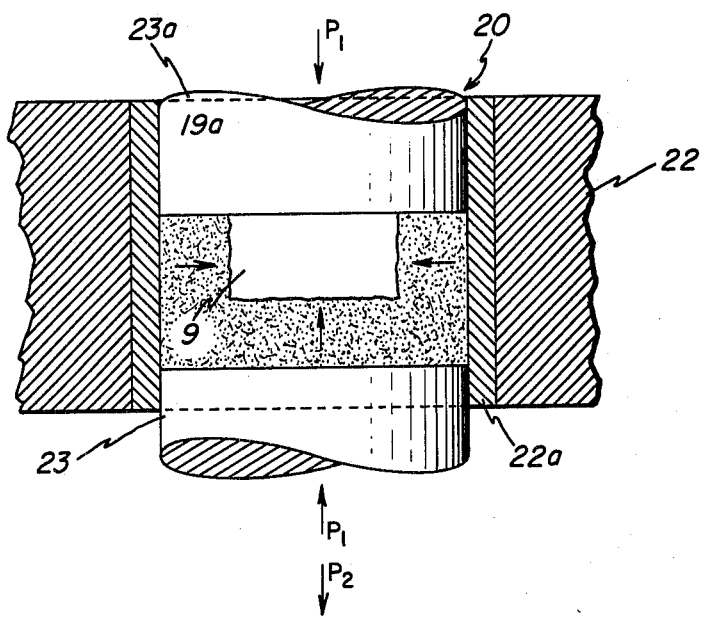
FIG. 1 is a sectional view through an apparatus for forming a cavity in the pressure-transmitting powder medium.

In the arrangement shown in FIG. 1, a cavity of predetermined size is pressed into a pressure-transmitting powder medium 19a by means of mold 9. At this point sufficient pressure, generally about 10,000 psi to about 50,000 psi, need only be applied by piston 23a to make the powder 19a at least substantially stable in form so that when pressure is removed, i.e. piston 23a is withdrawn, the mold 9 can be removed leaving the cavity 11 it has depressed therein. The mold 9 can be of any smooth surfaced material such as, for example, stainless steel or cemented carbide, which can withstand the applied pressure and which can be withdrawn from the compacted powder to leave the cavity 11 it has impressed therein.

Figure 2:
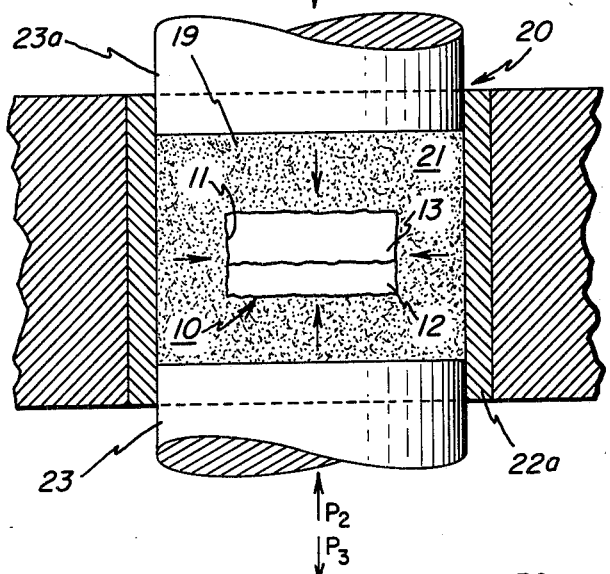
FIG. 2 is a sectional view through an apparatus for applying at least substantially isostatic pressure to the cell, i.e. cavity and contents, by means of a pressure-transmitting powder medium to dimensionally stabilize the cell producing a substantially isostatic system.

In FIG. 1 when mold 9 is withdrawn leaving cavity 11, there is disposed within the cavity, disc 12 of silicon and a mass of diamond crystals in contact with the silicon. To insure that the mass of diamond crystals has a thickness desired in the resulting polycrystalline body, the cavity should be of a size so that no free space is left therein which would allow a repositioning or substantial movement of the diamond particles during subsequent cold-pressing to dimensionally stabilize the system as shown in FIG. 2. Additional pressure transmitting powder is then placed over the cavity and its contents producing a powder enveloped cell 10, i.e. cavity and contents, as shown in FIG. 2.

As shown in FIG. 2, cell 10 is then subjected to a cold-pressing step which is carried out at room or ambient temperature whereby only sufficient pressure need be applied to produce a dimensionally stabilized substantially isostatic system. Specifically, in FIG. 2 in the cylindrical core of pressure mold 20 cell 10 is surrounded by mass 19 of pressure transmitting powder medium.

The present pressure transmitting powder medium is comprised of very fine particles, preferably −400 mesh, of a pressure transmitting powder medium which remains substantially unsintered under the pressure and temperature conditions of the present process and which is substantially inert to fluid silicon. Representative of such a powder is hexagonal boron nitride and silicon nitride. This pressure transmitting particulate or powder medium provides for the application of approximately or substantially isostatic pressure to cell 10, whereby cell 10 and its contents are dimensionally stabilized, i.e. densified, substantially uniformly producing a shaped substantially isostatic system of powder enveloped-cell wherein the density of the resulting compressed layer of crystals is higher than 65% by volume of the volume of compressed crystals. Pressure mold 20 (ring 22 and pistons 23, 23a) may be made of tool steel and, if desired, ring 22 may be supplied with a sintered carbide sleeve 22a as shown to permit the application of pressures as high as 200,000 psi for the cold pressing step shown in FIG. 2. Pressures higher than 200,000 psi provide no significant advantage. Within the confines of piston 23, sleeve 22a and piston 23a, as shown in FIG. 2 for the cold pressing step, pressure preferably in the range of from about 20,000 psi up to about 100,000 psi, and usually up to about 50,000 psi, is exerted on the pressure transmitting powder medium by the pistons actuated in the conventional manner until the applied pressure becomes stabilized as is done in conventional manner until the applied pressure becomes stabilized as is done in conventional powder packing technology.

Specifically, the particular cold pressure used is determinable empirically and a pressure higher than the pressure which produces a dimensionally stabilized substantially isostatic system produces no significant additional densification or dimensional stabilization of cell 10 and its contents.

The nature of present pressure transmitting powder medium, such as hexagonal boron nitride and silicon nitride, is such that it results in an approximation of a hydrostatic action in response to the uniaxially applied pressure to exert substantially isostatic pressure on all of cell 10. It is assumed that the applied pressure is transmitted substantially undiminished to cell 10. The cold pressing step diminishes the size of the voids to maximize the presence of capillary-size voids in the diamond mass, and it is useful in producing the required density of diamond crystals in excess of 65% by volume of the diamond mass. This reduction in void volume also reduces the ultimate content of non-diamond material in the diamond mass and provides more juxtaposed crystal-to-crystal areas properly located for effective bonding together.

After completion of this cold pressing step, the density of the compressed diamond crystals in cell 10 should be in excess of 65% by volume of the volume of crystals. Frequently, the diamond density of the compressed diamond crystals may range from about 66% to about but less than 85% by volume of the compressed diamond crystals. The higher the density of the crystals, the less will be the amount of non-diamond materials present between the crystals resulting in a proportionately harder abrasive body.

The substantially isostatic system 21 of powder-enveloped cell resulting from the cold-pressing step is then subjected to a hot-pressing step whereby it is subjected to a hot-pressing temperature and pressure simultaneously.

Specifically, when the cold-pressing step is completed, either one of pistons 23, 23a is withdrawn and the resulting consolidated substantially isostatic shaped system 21 is forced out of liner 22a and into a hole of identical diameter in graphite mold 30, the transferred system 21 now being contained within the wall of hole 31 between graphite pistons 32, 32a. Graphite mold 30 is provided with thermocouple 33 to provide an indication of the temperature being applied to the dimensionally-stabilized substantially-isostatic system 21. The mold 30, with the substantially-isostatic system 21 so contained, is placed inside a conventional hot-pressing furnace (not shown). The furnace chamber is evacuated or at least substantially evacuated causing evacuation of system 21 including cell 10, providing system 21 and cell 10 with a substantial vacuum in which the hot-pressing step can be carried out. However, if desired, at this point, nitrogen, or hydrogen, or an inert gas such as argon can be fed into the furnace chamber to provide the chamber as well as system 21 including the interior of cell 10 with a suitable hot-pressing atmosphere. While pistons 32, 32a apply a uniaxial pressure, i.e. the hot-pressing pressure, to system 21, the temperature thereof is raised to a temperature at which the silicon disc 12 is fluid.

In the hot-pressing step the hot-pressing temperature should be reached quickly and held at such temperature under the hot-pressing pressure usually for at least about one minute to insure satisfactory infiltration through the diamond crystal mass. Generally, a hot-pressing time period ranging from about 1 minute to about 5 minutes is satisfactory. Since conversion of diamond to a non-diamond elemental carbon phase depends largely on time and temperature, i.e. the higher the temperature and the longer the time at such temperature the more likely the conversion to non-diamond elemental carbon, the hot-pressing step must be carried out before 5% by volume of the diamond is converted to non-diamond elemental carbon and this is determinable empirically. Conversion of 5% or more by volume of diamond to non-diamond elemental carbon is likely to result in elemental non-diamond carbon phase being left in the final product which would have a significantly deleterious effect on its mechanical properties.

In the hot-pressing step the application of the hot-pressing pressure to the fluid silicon breaks up interfacial refractory layer or slag, largely oxide as well as carbide, which usually is present or which forms between the fluid silicon and diamond surfaces exposing the capillary void system to the silicon, after which infusion by capillary action occurs. Tests have shown that unless sufficient pressure is applied and maintained throughout hot-pressing to system 21 when the silicon is fluid to break up the slag, infusion of the diamond mass by the silicon will not occur.

Also, since in the present process when the silicon liquefies any slag or oxide which might form or be present therein floats therein and is left behind when the fluid silicon infiltrates through the compacted diamond mass. As a result, the present diamond compact is free of glassy phase which would prevent a strong bond from forming between the diamond and the silicon-atom containing bonding medium.

During hot-pressing, as the fluid silicon infiltrates and flows through the diamond mass, it encapsulates the surfaces of the compressed diamond crystals reacting with the diamond surfaces or any non-diamond elemental carbon phase which may form, to produce silicon carbide at the surfaces of the diamond crystals resulting in an integral strongly-bonded diamond body.

It is during this hot-pressing step that it is particularly important that substantially isostatic conditions be maintained so that when the silicon is converted to the fluid state, this fluid will not be able to pass between mass 13 and cavity 11 and escape to any significant extent, but will be forced to move through the mass 13 of diamond crystals. The portion of the pressure transmitting powder in close association with the contents of the cavity, i.e. the portion of the pressure transmitting powder extending from the inner wall of the cavity or cell to preferably about one inch therefrom, should not contain interconnecting pores larger than about 5 microns to prevent excessive leakage of fluid silicon during the hot-pressing.

When the hot-pressing step is completed, at least sufficient pressure should be maintained during cooling of the hot-pressed system 21 so that hot-pressed cell 10, maintained within the system 21 during cooling, is subject to substantially isostatic pressure sufficient to preserve its dimensional stability. Preferably, hot-pressed system 21 is allowed to cool to room temperature, and the resulting present diamond body is recovered. Any squeezed out excess silicon at the outside surfaces of the polycrystalline diamond body can be removed by conventional techniques such as grinding.

The present polycrystalline diamond body is comprised of a mass of diamond crystals adherently bonded to each other by a silicon atom-containing bonding medium consisting essentially of silicon carbide and elemental silicon, said diamond crystals ranging in size from about 1 micron to about 1000 microns, the density of said diamond crystals ranging from about 65% by volume to about but less than 80% by volume of said body, frequently about 78% by volume of said body, said silicon atom-containing bonding medium being present in an amount ranging up to about 35% by volume of said body, said bonding medium being distributed at least substantially uniformly throughout the polycrystalline diamond body, the portion or surface of said bonding medium in contact with the surfaces of the bonded diamonds being at least in substantial amount silicon carbide, i.e. at least about 85% by volume and preferably 100% by volume of the portion or surface of the bonding medium in direct contact with the surfaces of the diamond crystals is silicon carbide. The present diamond body is pore free or at least substantially pore free.

The amount of silicon carbide and silicon in the bonding medium of the present diamond body can vary depending on the extent of the reaction between the surfaces of the diamond crystals and the infiltrating silicon as well as the reaction between non-diamond elemental carbon phase and infiltrating silicon. Assuming all other factors are equal, the particular amount of silicon carbide present in the bonding medium depends largely on the particular hot-pressing temperature used and the time period at such temperature. Specifically, with increasing time and/or temperature, the content of silicon carbide increases. The production of the present body of bonded diamond crystals with a particular desired amount of silicon carbide to attain certain desirable properties, for example, is determinable empirically. Specifically, the bonding medium can range in composition from a detectable amount of silicon carbide to a detectable amount of elemental silicon, and by a detectable amount of silicon carbide or elemental silicon it is meant herein an amount detectable by selective area diffraction analysis of transmission electron microscopy on a thin section of the present body. Generally, however, the present bonding medium consists essentially of silicon carbide in an amount ranging from about 2% by volume to about 30% by volume of the present polycrystalline diamond body and elemental silicon in an amount ranging from about 33% to about 5% by volume of the body. In addition, the diamond content of the present body generally ranges from about 65% by volume to about but less than 80% by volume of the body.

Selective area diffraction analysis of transmission electron microscopy on a thin section of the present polycrystalline diamond body also will show that the portion of the bonding medium in contact with the surfaces of the bonded diamonds being at least in substantial amount silicon carbide.

The present body of bonded diamond crystals is void or pore-free or at least substantially pore-free, i.e. it may contain voids or pores in an amount less than 1% by volume of the body providing such voids or pores are small, less than 0.5 micron, and sufficiently uniformly distributed throughout the body so that they have no significant deteriorating effect on its mechanical properties. The void or pore content of the present body is determinable by standard metallographic technique such as, for example, optically examining a polished cross-section of the body.

The present diamond body also is free of elemental non-diamond carbon phase in that it does not contain non-diamond elemental carbon phase in an amount detectable by X-ray diffraction analysis.

When the present process is carried out with the silicon and mass of diamond crystals in the form of layers superimposed on each other, the resulting product can have at least one flat face and can be in a number of forms such as a disc, square or rectangle, rod or bar.

When the present process is carried out with the silicon in the form of a tube or a cylinder with a core or hole extending through it and the diamond particles are packed in the core, the silicon infiltrates throughout the core of the compressed diamond crystals during hot-pressing producing the present diamond body in the form of a circular bar.

When the present process is carried out with a bar of silicon centrally positioned in the cavity and the space between the silicon bar and cavity wall packed with diamond crystals, the silicon infiltrates through the encircling mass of diamond crystals producing the present diamond body in the form of a tube or hollow cylinder.

One particular advantage of the present invention is that the present polycrystalline diamond body can be produced in a wide range of sizes and shapes. For example, the present body can be as wide or as long as one inch or longer. Polycrystalline diamond bodies one inch in length or longer and having the present diamond density are not producible as a practical matter, or are not producible at all, by techniques utilizing the ultra high pressures and temperatures of the diamond stable region due to the limitations of the equipment necessary to sustain the severe pressure-temperature requirements for the necessary period of time, i.e. the equipment is so complex and massive that its capacity is limited. On the other hand, the present polycrystalline diamond body can be produced as small or as thin as desired, but it will always be in excess of a monolayer of diamond crystals.

A portion of the present diamond body can be soldered, brazed or otherwise adhered to a suitable support material such as sintered or hot-pressed silicon carbide, sintered or hot-pressed silicon nitride, or a cemented carbide, or a metal such as molybdenum forming a tool insert which, for example, can be held by a tool shank adapted to be held in a machine tool whereby the exposed surface of the diamond body can be used for direct machining. Alternatively, the present diamond crystal body can be mechanically clamped to a lathe tool for direct machining by the exposed surface of the diamond body.

The invention is further illustrated by the following example.

EXAMPLE

The apparatus used in this example was substantially the same as that shown in FIGS. 1, 2 and 3, Hexagonal boron nitride powder ranging in size from about 2 microns to about 20 microns was packed into a die and a cylinder used as a mold was pressed into the powder as shown in FIG. 1 by 19a and 9.

The cylinder was made of cemented metal carbide and was about 0.35 inch in diameter and 0.25 inch in thickness. The axis of the cylinder was approximately lined up with the central axis of the die.

In this embodiment, unlike FIG. 1, after the cylinder was inserted in the powder, additional hexagonal boron nitride powder was placed in the die covering the cylinder completely, and the resulting powder-enveloped cylinder was pressed at room temperature under a pressure of 50,000 psi. Piston 23a was then withdrawn and piston 23 was used to push the resulting pressed powder-enveloped cylinder partially out of the die. The exposed portion of the pressed powder was removed leaving the cylinder partially exposed. The cylinder was then withdrawn leaving the cavity it had impressed therein.

A 140 milligram disc of silicon having a diameter the same as the inner diameter of the cavity was placed in the bottom of the cavity. About 250 milligrams of size-graded diamond powder, ranging from about 1 micron to about 60 microns with about 40 weight % being smaller than 10 microns, was packed on top of the silicon disc.

A disc of hot-pressed hexagonal boron nitride powder of the same diameter as the inner diameter of the cavity was placed within the cavity on top of the diamond powder to insure that the surface of the resulting polycrystalline diamond body would be flat.

The entire mass was then pushed into the center of the die by piston 23a which was then withdrawn. An additional amount of hexagonal boron nitride powder was added to the die to cover the hot-pressed disc of hexagonal boron nitride resulting in the cavity and contents being enveloped by hexagonal boron nitride as shown by 19 in FIG. 2. The resulting charge was then pressed at room temperature, i.e. cold-pressed, in the steel die under a pressure of 80,000 psi as shown in FIG. 2 subjecting the cavity and its contents to substantially isostatic pressure until the pressure became stabilized producing a dimensionally stabilized shaped substantially isostatic system of powder-enveloped cavity and contents. From previous experiments it was known that in the resulting pressed assembly, i.e. in the resulting shaped substantially isostatic system of powder-enveloped cavity and contents, the density of the diamond crystals was higher than 75% by volume of the compressed diamond mass. Also, the amount of silicon present was about 40% by volume of the compressed diamond mass.

The resulting pressed assembly 21 of powder-enveloped cavity and contents was then hot-pressed, i.e. it was pushed into a graphite mold of the same diameter size as the steel die, as shown in FIG. 3, and placed within an induction heater. The interior of the cavity was evacuated and a nitrogen atmosphere introduced therein by evacuating the heater to about 10 torr before back filling it with flowing dry nitrogen. A pressure of about 5000 psi was applied to the pressed assembly 21 and maintained thereon by the graphite die, which was then heated to a temperature of 1500° C. in 7 minutes by the induction heater. With this heating the pressure reached about 10,000 psi due to the expansion of the entire system.

At 1500° C. the piston 23a and the pressure dropped to about 5000 psi indicating that the silicon had melted and become fluid and had infiltrated through the diamond mass. The pressure was raised back to 10,000 psi where it was maintained for one minute at 1500° C. to insure that the silicon had completely infiltrated through the diamond mass. The power supply was then turned off but no additional pressure was applied. This provided a firm pressure at high temperature but reduced pressure at lower temperature providing adequate geometric stability. At room temperature, the resulting polycrystalline diamond body was recovered.

After removing surface scales of hexagonal boron nitride powder, the resulting integral polycrystalline diamond body had the shape of a disc with a diameter of 350 mils and a thickness of 50 mils.

The polycrystalline disc had substantially smooth flat surfaces and appeared to be well-infiltrated by the bonding medium. Optical examination of the disc, magnified 100 times under a microscope, showed it to be pore-free.

Using a hammer and wedge, the disc was fractured substantially in half. Examination of the fractured cross-sectional surfaces of the disc showed that the fracture was transgranular rather than intergranular, i.e., it had fractured through the diamond grains rather than along the grain boundaries. This indicates that the bonding medium was highly adherent and was as strong as the diamond grains or crystals themselves. Also, the fractured surfaces were pore-free and the bonding medium was uniformly distributed throughout the body.

A cross-sectional fractured surface of the disc was polished on a cast iron scaife. Examination of the polished surface showed no strings of holes formed from diamond fragment pullout illustrating strong bonding therein and its usefulness as an abrasive. The polished cross-section is shown in FIG. 4.

The diamond density was determined to be about 72% by volume of the disc. Diamond density was determined by the standard point count technique using a photomicrograph of the polished cross-sectional surface magnified 690 times and the surface area analyzed was sufficiently large to represent the microstructure of the entire body.

X-ray diffraction analysis of the crushed body showed it to be comprised of diamond, silicon carbide and elemental silicon, indicating that the silicon carbide and elemental silicon were present in an amount of at least 2% by volume of the body. However, the X-ray diffraction analysis of the crushed body did not detect elemental non-diamond carbon phase.

The following patent and copending applications assigned to the assignee hereof, are incorporated herein by reference.

U.S. Pat. No. 3,982,911 to Lee discloses a process of preparing a composite cubic boron nitride abrasive body by disposing cubic boron nitride crystals together with a substrate and bonding alloy in a protective metal container, placing the container within a pressure transmitting powder medium, applying substantially isostatic pressure to the container and its contents via the powder medium, and hot-pressing the resulting powder-enveloped container.

Ser. No. 787,858 Filed Apr. 15, 1977 in the names of Lee et al discloses a process of preparing a cubic boron nitride abrasive composite by disposing cubic boron nitride crystals, aluminum or aluminum alloy and a silicon carbide ceramic substrate in a container, placing the container within a pressure transmitting powder medium, applying substantially isostatic pressure to the container and its contents via the powder medium, and hot-pressing the resulting powder-enveloped container.

Ser. No. 844,448, now U.S. Pat. No. 4,124,401 filed of even date herewith in the names of Lee et al discloses a polycrystalline diamond body formed by subjecting a mass of diamond crystals in contact with a mass of silicon-rich eutectiferous alloy to substantially isostatic pressure to dimensionally stabilize them, and hot-pressing the resulting system to infiltrate the alloy through the diamond mass.

Ser. No. 844,449 filed of even date herewith in the names of Lee et al relates to the production of a composite of polycrystalline diamond body and silicon nitride substrate by subjecting a mass of diamond crystals in contact with a mass of eutectiferous silicon-rich alloy and a silicon nitride substrate to substantially isostatic pressure to dimensionally stabilize them, and hot-pressing the resulting system to infiltrate the alloy through the diamond mass and into contact with the substrate.

Ser. No. 844,447 filed of even date herewith in the names of Lee et al discloses a composite of a polycrystalline diamond body and silicon carbide substrate formed by subjecting a mass of diamond crystals in contact with a mass of eutectiferous silicon-rich alloy and a silicon carbide substrate to substantially isostatic pressure to dimensionally stabilize them, and hot-pressing the resulting system to infiltrate the alloy through the diamond mass and into contact with the substrate.

What is claimed is:

1. A process for preparing a polycrystalline diamond body at pressures substantially below those required by the diamond stable region which includes a hot-pressing step and which comprises:
   (a) pressing a cavity in a pressure-transmitting powder medium that transmits applied pressure substantially undiminished and remains substantially unsintered during said hot-pressing;
   (b) placing within said cavity a mass of silicon and a mass of diamond crystals in contact with said mass of silicon;
   (c) covering said cavity and its contents with an additional amount of said pressure-transmitting powder medium thereby enveloping the cavity with pressure-transmitting powder medium;
   (d) applying sufficient substantially isostatic pressure to said cavity and its contents via said powder medium to substantially stabilize the dimensions of said cavity and its contents substantially uniformly producing a shaped substantially isostatic system of powder-enveloped cavity and contents, wherein the density of diamond crystals is higher than 65% by volume of the volume of the resulting compressed mass of diamond crystals, said silicon being used in amount sufficient to fill the interstices of said compressed mass of diamond crystals;
   (e) providing said substantially isostatic system including said cavity and contents with an atmosphere which has no significant deleterious effect on said diamond crystals and said silicon during said hot-pressing;
   (f) hot-pressing the resulting substantially isostatic system to produce fluid silicon and infiltrate it through the interstices of said compressed mass of diamond crystals, said hot-pressing being carried out at a temperature ranging from a temperature at which said silicon becomes fluid up to about 1600° C. under a pressure sufficient to infiltrate the fluid silicon through the interstices of said compressed mass of diamond crystals, said hot-pressing converting less than 5% by volume of said diamond crystals to non-diamond elemental carbon, said infiltrating silicon encapsulating the surfaces of the compressed diamond crystals reacting with the diamond surfaces or any non-diamond elemental carbon producing silicon carbide at the surfaces of the diamond crystals;
   (g) maintaining sufficient pressure on the resulting hot-pressed substantially isostatic system during cooling thereof to at least substantially maintain the dimensions of said hot-pressed system;
   (h) recovering the resulting polycrystalline diamond body wherein the diamond crystals are bonded together by a silicon-atom containing medium comprised of silicon carbide and silicon, and wherein the diamond crystals are present in an amount of at least 65% by volume to about but less than 80% by volume of said body, said diamond body being at least substantially pore-free and being free of elemental non-diamond carbon phase in that it does not contain non-diamond elemental carbon phase in an amount detectable by X-ray diffraction analysis.

2. The process of claim 1 wherein said diamond crystals are size-graded ranging from about 1 micron to about 60 microns.

3. The process of claim 1 wherein the amount of silicon ranges from about 25% by volume to about 60% by volume of said compressed mass of diamond crystals.

4. The process of claim 1 wherein the density of said compressed mass diamond crystals ranges up to about but less than 85% by volume of the volume of compressed crystals.

5. The process of claim 1 wherein said mass of silicon is in the form of a layer and said mass of diamond crystals is in the form of a layer superimposed on said layer of silicon.

6. The process of claim 1 wherein said mass of silicon is in the form of a bar substantially centrally located within said cavity and said mass of diamond crystals is packed in the encircling space between said silicon and said cavity.

7. The process of claim 1 wherein said mass of silicon is in the form of a cylinder having a core extending through it and said mass of diamond crystals is packed within said core of said silicon cylinder.

* * * * *